(12) United States Patent
Kim et al.

(10) Patent No.: US 12,311,928 B2
(45) Date of Patent: May 27, 2025

(54) METHOD FOR CONTROLLING SECONDARY COLLISION AVOIDANCE OF VEHICLE

(71) Applicants: Hyundai Motor Company, Seoul (KR); Kia Corporation, Seoul (KR)

(72) Inventors: In Su Kim, Anyang-si (KR); Myung Ki Yeom, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 186 days.

(21) Appl. No.: 18/228,113

(22) Filed: Jul. 31, 2023

(65) Prior Publication Data

US 2024/0336259 A1  Oct. 10, 2024

(30) Foreign Application Priority Data

Apr. 7, 2023 (KR) .................. 10-2023-0045755

(51) Int. Cl.
*B60W 30/095* (2012.01)
*B60Q 5/00* (2006.01)
*B60W 10/04* (2006.01)
*B60W 10/18* (2012.01)
*B60W 40/04* (2006.01)
*B60W 60/00* (2020.01)

(52) U.S. Cl.
CPC ......... *B60W 30/0956* (2013.01); *B60Q 5/006* (2013.01); *B60W 10/04* (2013.01); *B60W 10/18* (2013.01); *B60W 40/04* (2013.01); *B60W 60/0015* (2020.02); *B60W 60/0027* (2020.02); *B60W 2554/4041* (2020.02); *B60W 2554/4044* (2020.02); *B60W 2554/802* (2020.02)

(58) Field of Classification Search
CPC ......... B60W 30/0956; B60W 60/0015; B60W 60/0027; B60W 10/04; B60W 10/18; B60W 40/04; B60W 2554/4041; B60W 2554/4044; B60W 2554/802; B60Q 5/006
See application file for complete search history.

(56) References Cited

U.S. PATENT DOCUMENTS

| | | | |
|---|---|---|---|
| 11,433,885 B1* | 9/2022 | Beller | B60W 30/095 |
| 2017/0113668 A1* | 4/2017 | Jeon | B60T 7/22 |
| 2022/0063672 A1* | 3/2022 | Corbett | B60W 60/0016 |
| 2022/0111837 A1* | 4/2022 | Yeom | B60W 60/00186 |
| 2022/0135026 A1* | 5/2022 | Schleede | B60W 60/0027 |
| | | | 701/26 |
| 2022/0169287 A1* | 6/2022 | Beaurepaire | G01C 21/3492 |
| 2023/0075782 A1* | 3/2023 | Co | A61B 5/7264 |
| 2023/0140569 A1* | 5/2023 | Foster | B60W 60/0017 |
| | | | 701/400 |
| 2024/0034358 A1* | 2/2024 | Grard | B60W 60/0011 |
| 2024/0144751 A1* | 5/2024 | Bohman | G07C 5/085 |
| 2024/0336259 A1* | 10/2024 | Kim | B60W 10/04 |

* cited by examiner

*Primary Examiner* — Hussein Elchanti
(74) *Attorney, Agent, or Firm* — Morgan, Lewis & Bockius LLP

(57) ABSTRACT

A method for controlling a secondary collision avoidance of a vehicle, includes, while an autonomous vehicle is stopped, identifying the positions of another vehicle and an obstacle around the vehicle in advance, and when a side collision occurs by another vehicle, controlling, by an autonomous driving controller, a driving torque and a braking torque of the vehicle to avoid a secondary collision with a vehicle other than another vehicle or the obstacle which may occur after the side collision, minimizing injury to passengers.

20 Claims, 8 Drawing Sheets

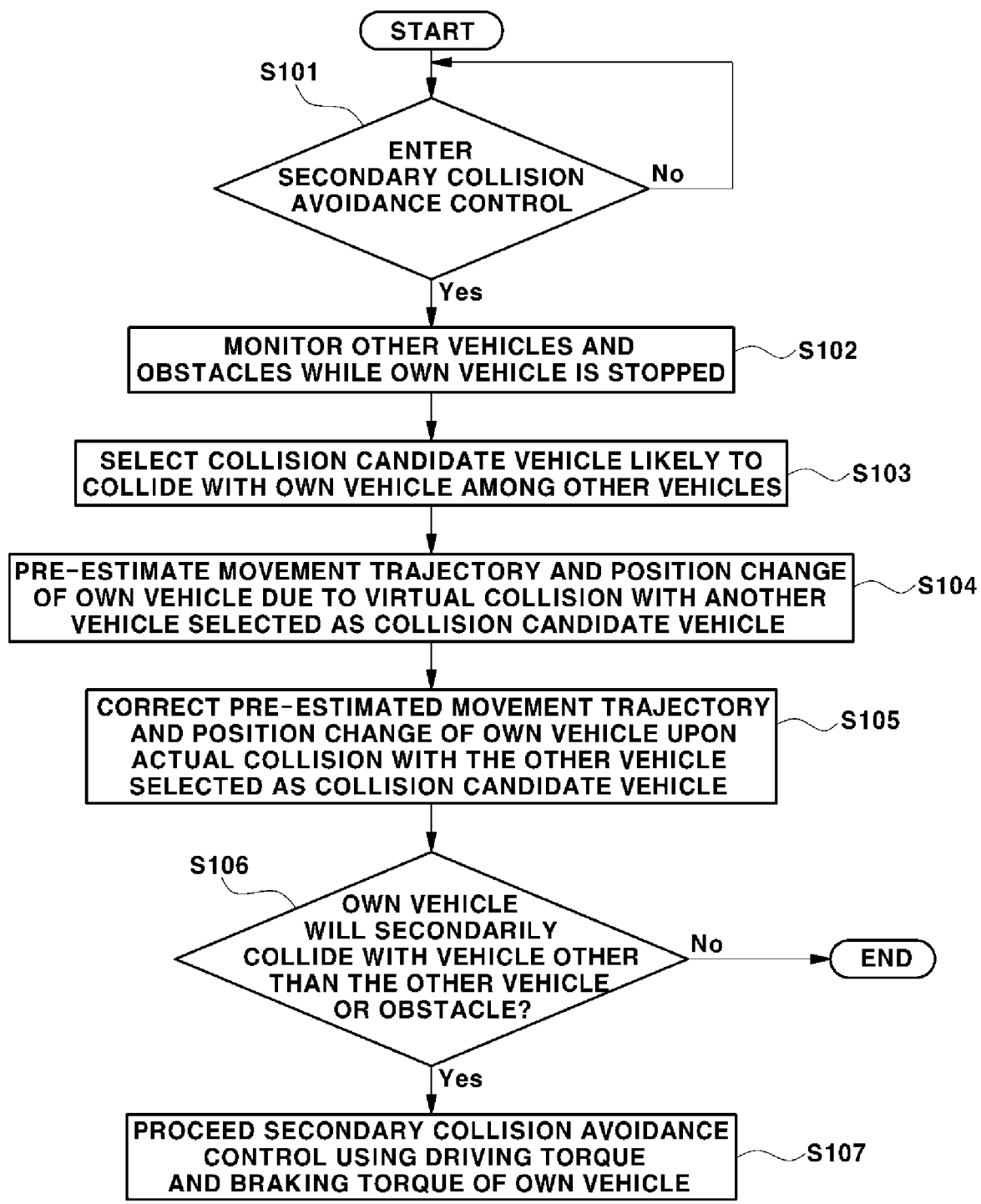

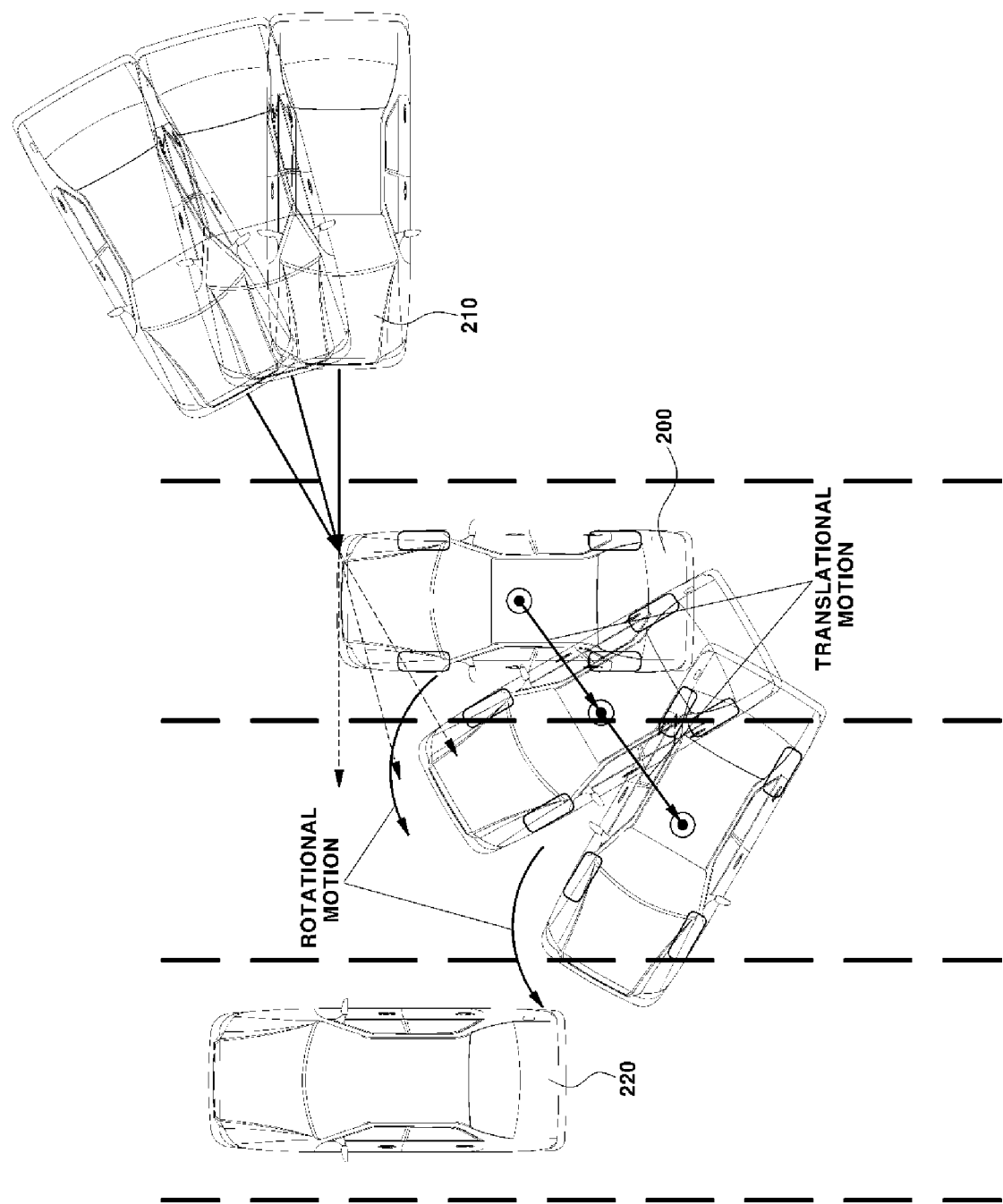

METHOD FOR CONTROLLING SECONDARY COLLISION AVOIDANCE OF VEHICLE

CROSS-REFERENCE TO RELATED APPLICATION

The present application claims priority to Korean Patent Application No. 10-2023-0045755, filed on Apr. 7, 2023, the entire contents of which is incorporated herein for all purposes by this reference.

BACKGROUND OF THE PRESENT DISCLOSURE

Field of the Present Disclosure

The present disclosure relates to a method for controlling a secondary collision avoidance of a vehicle. The present disclosure relates to a control method for avoiding, after a vehicle is hit from the side thereof by another vehicle, the vehicle from secondarily colliding with a vehicle other than another vehicle or an obstacle.

Description of Related Art

A driving mode of an autonomous vehicle includes a manual driving mode in which an operator of the vehicle may directly intervene in driving the vehicle, in addition to an autonomous driving mode in which the vehicle travels to a destination without the operator directly manipulating a steering wheel, an accelerator pedal, a brake pedal, etc.

Accordingly, depending on the operator's will, the driving mode of the autonomous vehicle may be selected as the autonomous driving mode operated by the control of an autonomous driving controller or the manual driving mode in which the operator may directly control driving of the vehicle.

When the autonomous vehicle is operated in the autonomous driving mode, even if there are various collision risks, such as, an existence of an obstacle around the vehicle, another vehicle in the side lane suddenly cutting in, or a vehicle in front suddenly braking, the autonomous driving controller may control the driving of the vehicle to avoid a collision with another vehicle.

Furthermore, when a front collision or a rear collision occurs while the autonomous vehicle is traveling, the autonomous driving controller may control the driving of the vehicle to prevent a secondary collision with another vehicle and an obstacle.

However, a conventional control technique to prevent a secondary collision is mostly applied to a front or rear collision instead of a side collision, so a secondary collision avoidance control in the case of a side collision is needed.

In other words, when one vehicle is hit from the side thereof by another vehicle, the vehicle moves and rotates simultaneously due to the collision, and thus the rotation angle of the vehicle in the side collision is inevitably greater than in a front or rear collision. For the present reason, the risk of secondary collision of the vehicle with another vehicle or an obstacle in the vicinity greatly increases, resulting in greater injury to passengers. Therefore, a control technique to avoid a secondary collision in the event of a side collision of a vehicle is needed.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a control method for avoiding a secondary collision of a vehicle, the method including, while an autonomous vehicle is stopped, identifying the positions of another vehicle and an obstacle around the vehicle in advance, and when a side collision occurs by another vehicle, controlling, by an autonomous driving controller, a driving torque and a braking torque of the vehicle to avoid a secondary collision with a vehicle other than another vehicle or the obstacle which may occur after the side collision, minimizing injury to passengers.

Various aspects of the present disclosure are directed to providing a method for controlling a secondary collision avoidance of a vehicle, the method including monitoring, while the vehicle is stopped, other vehicles or obstacles around the vehicle by a detection portion for autonomous driving of the vehicle, selecting, by an autonomous driving controller, another vehicle among other vehicles as a collision candidate vehicle likely to collide with the vehicle based on a monitoring signal of the detection portion for the autonomous driving, pre-estimating, by the autonomous driving controller, a movement position change of the vehicle due to a virtual collision with another vehicle selected as the collision candidate vehicle, correcting, by the autonomous driving controller, the pre-estimated movement position change of the vehicle due to the virtual collision with another vehicle when the collision candidate vehicle approaches and crashes on the side of the vehicle, determining, by the autonomous driving controller, the possibility of a secondary collision in which the vehicle secondarily collides with an additional vehicle other than another vehicle or an obstacle around the vehicle based on the corrected movement position change of the vehicle, and proceeding, by the autonomous driving controller, a secondary collision avoidance control using a driving torque and braking torque of the vehicle when it is determined that the vehicle may collide with the additional vehicle other than another vehicle or the obstacle.

In an exemplary embodiment of the present disclosure, the selecting of the collision candidate vehicle may include checking whether another vehicle approaching the vehicle exists within a predetermined radius of the vehicle, based on the monitoring signal of the detection portion for the autonomous driving, determining, when another vehicle approaching exists within the predetermined radius of the vehicle, a collision index indicating the possibility of collision with another vehicle approaching within the predetermined radius of the vehicle, and selecting other vehicle including a collision index exceeding a reference value as the collision candidate vehicle likely to collide with the vehicle.

In another exemplary embodiment of the present disclosure, the collision index may be determined by multiplying the speed of another vehicle approaching the vehicle, the distance between the vehicle and another vehicle, and the expected collision area of the vehicle with respect to another vehicle.

In yet another exemplary embodiment of the present disclosure, the expected collision area may be determined differently based on the length, the width, and the height of the vehicle, the distance from the front end portion of the vehicle to the center of gravity of the vehicle, the distance from the center of gravity of the vehicle to another vehicle, and the relative heading angle of the vehicle with respect to another vehicle.

In yet another exemplary embodiment of the present disclosure, the determining of the expected collision area may include setting a body of the vehicle in a virtual rectangular shape based on the length, the width, and the height of the vehicle, and the distance from the front end portion of the vehicle to the center of gravity of the vehicle, identifying the distance from the center of gravity of the vehicle to another vehicle and the relative heading angle of the vehicle with respect to another vehicle, projecting another vehicle in the direction of the relative heading angle when the distance from the center of gravity of the vehicle to another vehicle is within a predetermined distance, and overlapping another vehicle projected in the direction of the relative heading angle on the body of the vehicle set in the virtual rectangular shape to determine the cross-sectional area of the overlapping portion as the expected collision area.

In still yet another exemplary embodiment of the present disclosure, the pre-estimating of the movement position change of the vehicle due to the virtual collision with another vehicle selected as the collision candidate vehicle may include determining state variables including a longitudinal acceleration Vx, a lateral acceleration Vy, and a rotational angular velocity Wz by use of the traveling speed of the collision candidate vehicle, the collision angle when the collision candidate vehicle approaches the vehicle and collides therewith, and longitudinal and lateral relative distances to the collision candidate vehicle monitored by the detection portion for the autonomous driving as variables, and estimating a movement distance of the vehicle when the vehicle makes a translational motion, determined by use of the determined longitudinal acceleration Vx and lateral acceleration Vy as variables, and a rotation angle of the vehicle when the vehicle makes a rotation motion, determined by use of the rotational angular velocity Wz as a variable, as the movement position change of the vehicle due to the virtual collision with another vehicle.

In a further exemplary embodiment of the present disclosure, the method may further include, after pre-estimating the movement position change of the vehicle due to the virtual collision with another vehicle selected as the collision candidate vehicle, operating, by the autonomous driving controller, an alarm device to warn other vehicles and passengers of a primary collision or the secondary collision.

In another further exemplary embodiment of the present disclosure, the correcting of the pre-estimated movement position change of the vehicle due to the virtual collision with another vehicle may include receiving, by the autonomous driving controller, a yaw rate signal detected by a yaw rate sensor of the vehicle and longitudinal acceleration and lateral acceleration signals detected by an acceleration sensor of the vehicle when an actual collision with another vehicle occurs, determining, by the autonomous driving controller, a movement distance of the vehicle moved by a translational motion based on longitudinal acceleration V' x and lateral acceleration V' y signals detected by the acceleration sensor and determining a rotation angle of the vehicle rotated by a rotation motion based on a rotational angular velocity W' z signal detected as a yaw rate signal by the yaw rate sensor, and determining the determined movement distance of the vehicle moved by the translational motion and the determined rotation angle of the vehicle rotated by the rotation motion as a movement position change of the vehicle due to the actual collision with another vehicle.

In yet another further exemplary embodiment of the present disclosure, the determining of the possibility of the secondary collision may include, when there exists a vehicle other than another vehicle or an obstacle within the corrected movement position of the vehicle, concluding that the secondary collision in which the vehicle collides with the additional vehicle other than another vehicle or the obstacle occurs.

In yet another further exemplary embodiment of the present disclosure, the proceeding the secondary collision avoidance control may include applying a forward or backward driving torque to each wheel of the vehicle for a predetermined time period so that the vehicle moves forward or backward in a direction of avoiding the secondary collision, and selectively applying a driving torque or a braking torque to each wheel of the vehicle so that the vehicle turns in a direction of avoiding the secondary collision with the additional vehicle other than another vehicle or the obstacle.

Other aspects and exemplary embodiments of the present disclosure are discussed infra.

It is to be understood that the term "vehicle" or "vehicular" or other similar terms as used herein are inclusive of motor vehicles in general, such as passenger vehicles including sports utility vehicles (SUV), buses, trucks, various commercial vehicles, watercraft including a variety of boats and ships, aircraft, and the like, and include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example, a vehicle powered by both gasoline and electricity.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

The above and other features of the present disclosure are discussed infra.

BRIEF DESCRIPTION OF THE DRAWINGS

FIG. 4 is a flowchart of a method for controlling a secondary collision avoidance of a vehicle according to an exemplary embodiment of the present disclosure;

FIG. 5 is a schematic view exemplarily illustrating an example in which a method for controlling a secondary collision avoidance of a vehicle according to an exemplary embodiment of the present disclosure is not executed;

Figure 1:
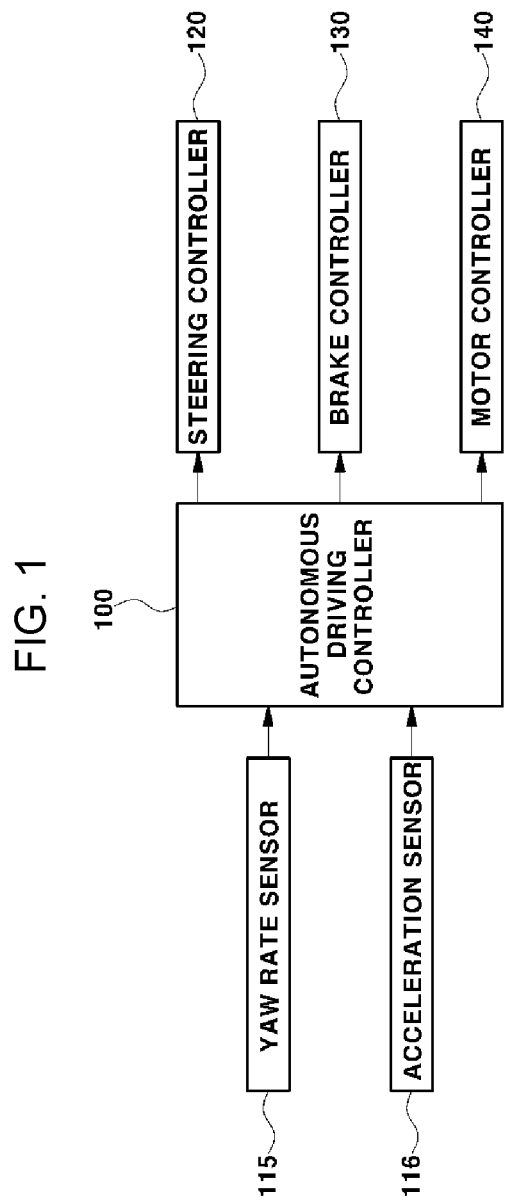
FIG. 1 and FIG. 2 are control configuration views of a method for controlling a secondary collision avoidance of a vehicle according to an exemplary embodiment of the present disclosure.

It should be understood that the appended drawings are not necessarily to scale, presenting a somewhat simplified representation of various exemplary features illustrative of the basic principles of the present disclosure. The specific design features of the present disclosure as included herein, including, for example, specific dimensions, orientations, locations, and shapes, will be determined in part by the particular intended application and usage environment.

In the figures, the reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, exemplary embodiments of the present disclosure will be described with reference to the accompanying drawings.

Figure 2:
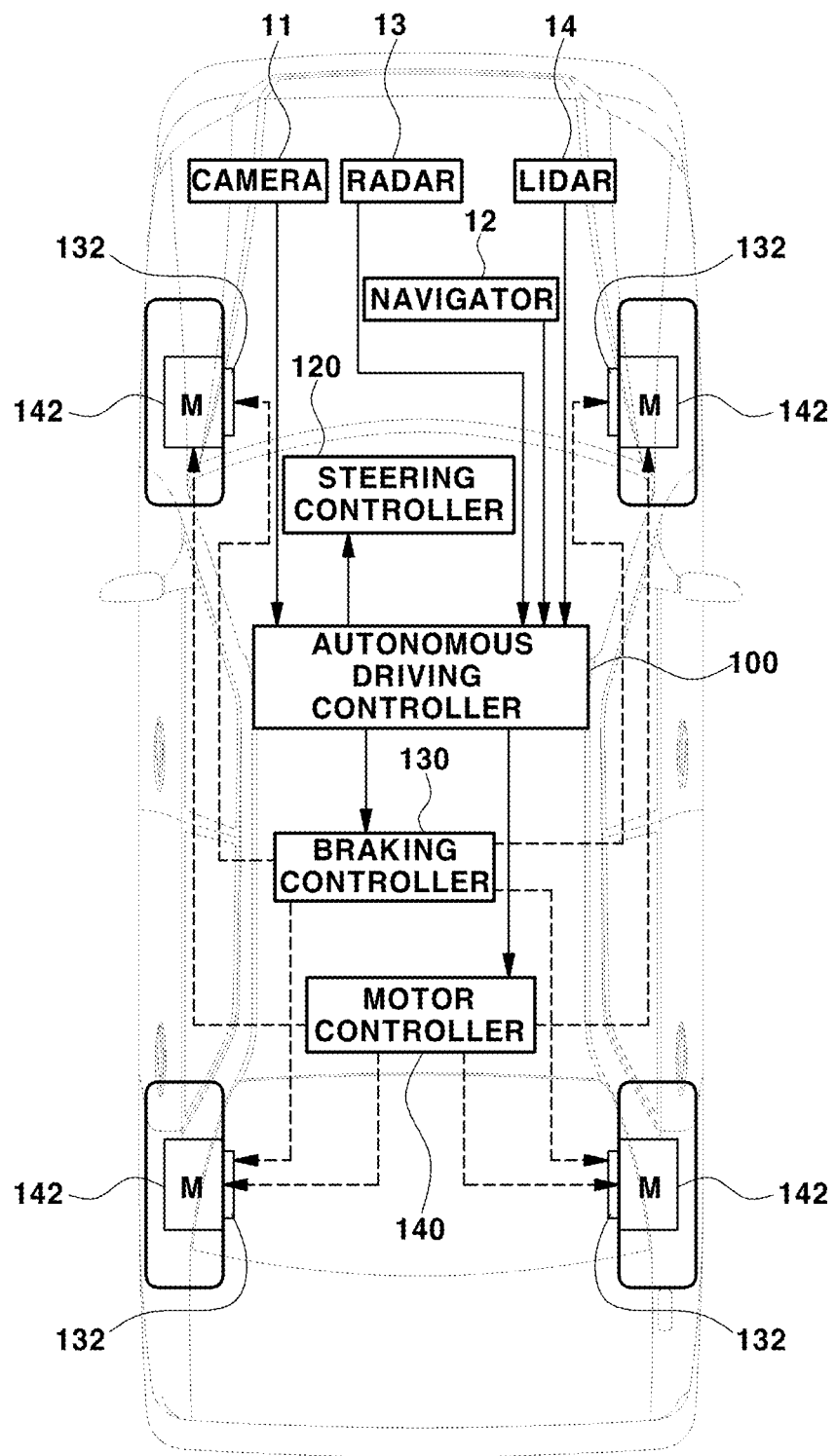

FIG. 1 and FIG. 2 are control configuration views of a method for controlling a secondary collision avoidance of a vehicle according to an exemplary embodiment of the present disclosure.

As illustrated in FIG. 1, an autonomous vehicle is provided with an autonomous driving controller 100 configured to control overall autonomous driving. The autonomous driving controller 100 includes an input portion to which a yaw rate sensor 115 and an acceleration sensor 116 are connected to transmit signals.

The autonomous driving controller 100 includes an output portion to which a steering controller 120 configured to control steering, a brake controller 130 configured to control a braking torque, and a motor controller 140 configured to control a driving torque are connected to receive a command signal.

The secondary collision avoidance control is a series of controls in which, while a vehicle is stopped, other vehicles and obstacles around the vehicle are monitored, a vehicle which may collide with the vehicle is selected among the other monitored vehicles, and the vehicle is moved to a space where a secondary collision is avoidable using a driving torque and a braking torque in the event of a collision with the selected vehicle.

As illustrated in FIG. 2, the autonomous driving controller 100 is configured to receive various monitoring information needed in autonomous driving from a detection portion for autonomous driving, which including a camera 11, a navigator 12, a radar (13: radio detection and ranging, RADAR) or a LiDAR (14: light imaging detection and ranging, LIDAR), mounted on the vehicle, and to perform overall control of autonomous driving including a traveling direction, acceleration and deceleration of the vehicle, etc. based on the monitoring information.

With the present configuration, for the secondary collision avoidance control while the vehicle is stopped, the detection portion for the autonomous driving, including the camera 11, the navigator 12, the radar 13 or the LiDAR 14, monitors other vehicles and obstacles around the vehicle according to the command of the autonomous driving controller 100.

Furthermore, for the secondary collision avoidance control, the autonomous driving controller 100 is configured to receive a signal, which includes monitoring information on other vehicles and obstacles around the vehicle, from the detection portion for the autonomous driving, including the camera 11, the navigator 12, the radar 13 or the LiDAR 14, and to select a collision candidate vehicle which may collide with the vehicle among another vehicles based on the received signal.

To the present end, the autonomous driving controller 100 first checks whether there exists another vehicle approaching the vehicle within a predetermined radius of the vehicle based on the monitoring signal of the detection portion for the autonomous driving. Accordingly, when it is determined that there exists another vehicle approaching within the predetermined radius of the vehicle, the autonomous driving controller 100 is configured to determine a collision index indicating the possibility of collision with another vehicle approaching within the predetermined radius of the vehicle. Thereafter, the autonomous driving controller 100 may select another vehicle including a collision index exceeding a reference value as the collision candidate vehicle which may collide with the vehicle, and may exclude another vehicle including a collision index less than the reference value from the collision candidate vehicle.

The process of determining the collision index will be described in detail below.

The autonomous driving controller 100 is configured to determine a rotational angular velocity Wz, a longitudinal acceleration Vx, and a lateral acceleration Vy of the vehicle, which are state variables, using the traveling speed of the collision candidate vehicle, the collision angle when the collision candidate vehicle approaches the vehicle and collides therewith, longitudinal and lateral relative distances to the collision candidate vehicle obtained by the signal monitored by the detection portion for the autonomous driving, and to pre-estimate a movement position change of the vehicle due to a virtual collision with another vehicle selected as the collision candidate vehicle using the determined state variables, which are the rotational angular velocity Wz, the longitudinal acceleration Vx, and the lateral acceleration Vy of the vehicle.

Alternatively, the autonomous driving controller 100 is configured to pre-estimate the movement position change of the vehicle due to the virtual collision with another vehicle selected as the collision candidate vehicle, based on various collision test result data on the vehicle, etc.

Here, the estimated movement position change of the vehicle due to the virtual collision with another vehicle may be different from the actual movement position change of the vehicle due to an actual collision with another vehicle, and thus may not be accurate.

For the present reason, the autonomous driving controller 100 is configured to receive a yaw rate signal detected by the yaw rate sensor 115 of the vehicle and longitudinal acceleration ax and lateral acceleration ay signals detected by the acceleration sensor 116 of the vehicle when an actual collision with another vehicle occurs to correct the estimated position change of the vehicle due to the virtual collision with another vehicle to match the movement position change of the vehicle due to the actual collision with another vehicle.

Furthermore, the autonomous driving controller 100 is configured to determine the possibility of the secondary collision in which the vehicle secondarily collides with a vehicle other than another vehicle or an obstacle in the vicinity based on the corrected movement position change of the vehicle.

For example, when there exists a vehicle other than another vehicle or an obstacle in the vicinity within the corrected movement position of the vehicle, the autonomous driving controller 100 may be configured to determine that a secondary collision in which the vehicle collides with the vehicle other than another vehicle or the obstacle may occur.

The autonomous driving controller 100 is configured to, when it is determined that the secondary collision will occur, send a steering command signal for avoiding a collision with another vehicle to the steering controller 120 so that the vehicle may turn in a direction of avoiding the secondary collision, send a braking torque command signal for avoiding a collision with another vehicle to the braking controller 130, and send a driving torque command signal for avoiding a collision with another vehicle to the motor controller 140.

The steering controller 120 is configured not only to control steering of the vehicle according to the steering intention by the autonomous driving logic of the autonomous driving controller 100 or according to the steering intention by the steering wheel operation of the operator, but also to control the steering to avoid a secondary collision according to the steering command signal for avoiding the collision with another vehicle.

The braking controller 130 is configured to selectively apply a braking torque to avoid a secondary collision to a hydraulic brake system 132, mounted in each wheel, according to the braking torque command signal for avoiding the secondary collision with the vehicle other than another vehicle.

The brake controller 130 may be an integrated electric brake (IEB) controller including an electronic stability control (ESC) for vehicle body attitude control.

The motor controller 140 is configured to control a driving torque for traveling and a regenerative braking torque on an in-wheel motor (IWM) 142, mounted in each wheel of the vehicle, and to selectively apply a driving torque to avoid the secondary collision to the in-wheel motor 142 mounted in each wheel according to the driving torque command signal for avoiding the secondary collision with another vehicle.

Therefore, while the vehicle is stopped, the collision candidate vehicle which may collide with the vehicle is selected among other vehicles in the vicinity, the movement position change of the vehicle due to the collision with the collision candidate vehicle is pre-estimated, and the movement position change of the vehicle due to the actual collision accident with another vehicle is corrected. When it is predicted that a secondary collision in which the vehicle collides with a vehicle other than another vehicle or an obstacle may occur based on the corrected movement position change of the vehicle, driving torque and braking torque are selectively applied to each wheel of the vehicle to allow the vehicle to automatically turn in the direction of avoiding the secondary collision, easily preventing a secondary collision accident.

Here, a method for controlling a secondary collision avoidance of a vehicle executed based on the above configuration will be described in detail.

Figure 3:
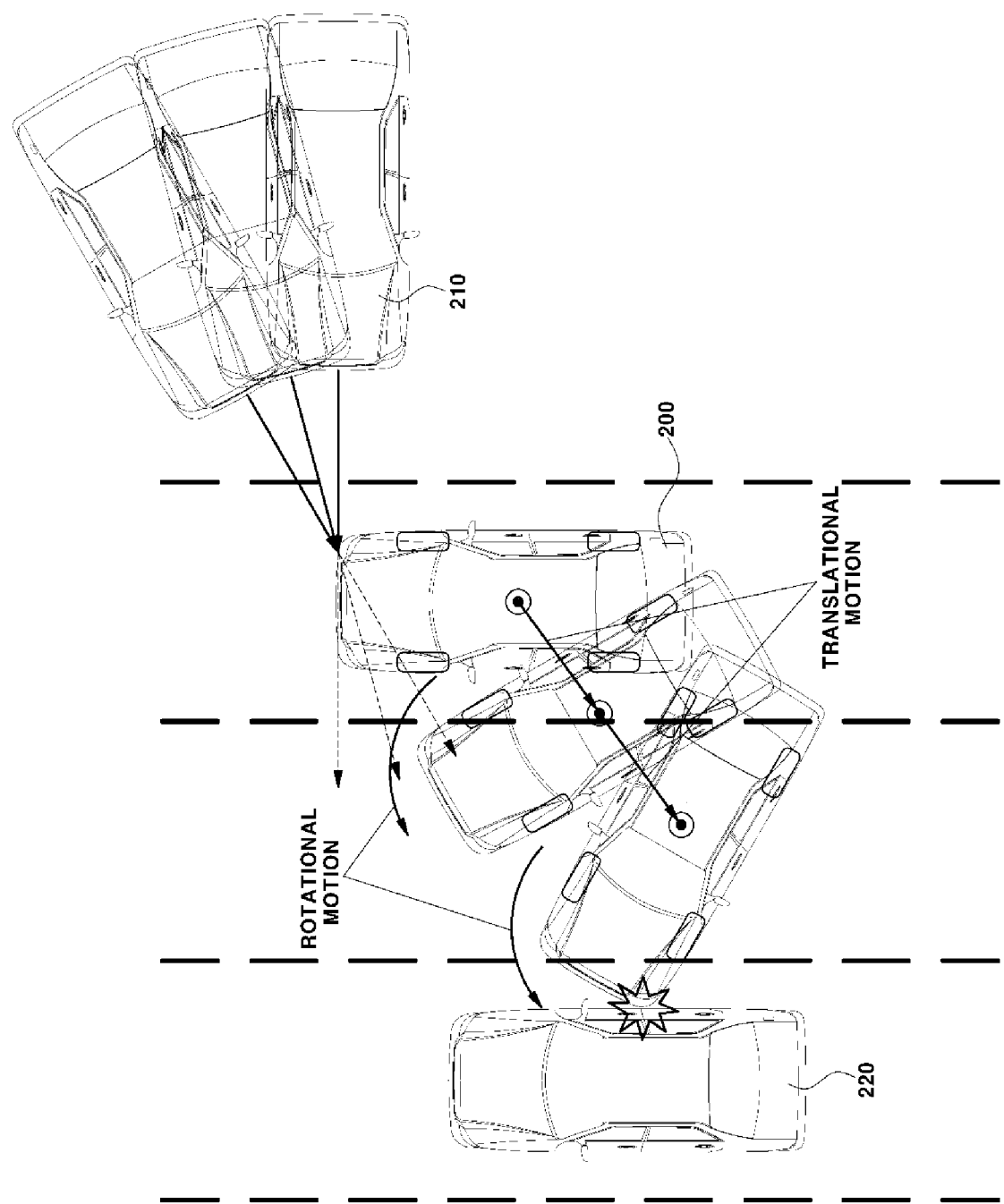
FIG. 3 is a schematic view exemplarily illustrating an example in which a secondary collision of a vehicle occurs.

FIG. 3 is a schematic view exemplarily illustrating an example in which a secondary collision of a vehicle occurs, and FIG. 4 is a flowchart of a method for controlling a secondary collision avoidance of a vehicle according to an exemplary embodiment of the present disclosure.

As illustrated in FIG. 3, when a vehicle 200 is hit from the side thereof by another vehicle 210 in the vicinity while the vehicle 200 is stopped, the vehicle 100 makes a translational motion and a rotation motion at the same time due to the impact caused by the side collision, whereby a secondary collision in which the vehicle 100 collides with a vehicle other than another vehicle or an obstacle 220 in the vicinity may occur.

To avoid the secondary collision of the vehicle, the autonomous driving controller 100 is first configured to determine whether to enter the secondary collision avoidance control while the vehicle is parked or stopped, in step S101.

In other words, the autonomous driving controller 100 checks whether the vehicle is currently parked or stopped to determine whether to enter the secondary collision avoidance control, and is configured to determine to enter the secondary collision avoidance control when confirmed that the vehicle is parked or stopped.

Thereafter, when the vehicle is stopped, for example, when the vehicle is stopped at a crosswalk for a traffic light signal, the detection portion for the autonomous driving monitors information on other vehicles and objects in the vicinity, in step S102.

In other words, the detection portion for the autonomous driving, including the camera 11, the radar 13 or the LiDAR 14, etc., monitors information on other vehicles and objects in the vicinity, and transmits the monitoring information to the autonomous driving controller 100.

Next, the autonomous driving controller 100 selects a vehicle which may collide with the vehicle among other vehicles based on the monitoring signal transmitted from the detection portion for the autonomous driving, in step S103.

Here, the monitoring information provided to the autonomous driving controller 100 from the detection portion for the autonomous driving may include the speed of the selected vehicle, the distance between the vehicle and the selected vehicle, the heading angle and location of the selected vehicle with respect to the heading angle and location of the vehicle, etc.

Accordingly, the autonomous driving controller 100 first checks whether there exists another vehicle approaching the vehicle within a predetermined radius of the vehicle based on the monitoring signal of the detection portion for the autonomous driving. Accordingly, when it is determined that there exists another vehicle approaching within the predetermined radius of the vehicle, the autonomous driving controller 100 is configured to determine a collision index indicating the possibility of collision with another vehicle approaching within the predetermined radius of the vehicle. Thereafter, the autonomous driving controller 100 selects another vehicle including a collision index exceeding a reference value as the collision candidate vehicle which may collide with the vehicle.

As in Equation 1 below, the collision index may be determined by multiplying the speed of another vehicle approaching the vehicle, the distance between the vehicle and another vehicle, and the expected collision area of the vehicle with respect to another vehicle.

$$\text{Collision index} = \text{Speed of other vehicle} \times \text{Distance between vehicle and other vehicle} \times \text{Expected collision area} \quad \text{(Equation 1)}$$

In Equation 1, the speed of another vehicle and the distance between the vehicle and another vehicle are values detected by the detection portion for the autonomous driving. The expected collision area may be determined differently based on the length, the width, and the height of the vehicle, the distance from the front end portion of the vehicle to the center of gravity (CG) of the vehicle, the distance from the CG point of the vehicle to another vehicle, the relative heading angle of the vehicle with respect to another vehicle, etc.

The autonomous driving controller 100 may be configured to determine the expected collision area in the following step, including setting a body of the vehicle in a virtual rectangular shape based on the length, the width, and the height of the vehicle, and the distance from the front end portion of the vehicle to the CG of the vehicle, identifying the distance from the CG point of the vehicle to another vehicle, and the relative heading angle of the vehicle with respect to another vehicle (the angle between the heading position of the vehicle and the heading position of another vehicle approaching the vehicle), projecting another vehicle in the direction of the relative heading angle determined as above when the distance from the CG of the vehicle to another vehicle is within a predetermined distance, and overlapping another vehicle projected in the direction of the relative heading angle on the body of the vehicle set in the virtual rectangular shape as above and determining the cross-sectional area of the overlapping portion.

As a result, the value of the cross-sectional area of the overlapping portion may be determined as the expected collision area.

Next, the autonomous driving controller 100 assumes that another vehicle selected as the collision candidate vehicle approaches and crashes on the side of the vehicle and pre-estimates the movement position change of the vehicle due to the virtual collision with another vehicle selected as the collision candidate vehicle, in step S104.

Here, the autonomous driving controller 100 may use the traveling speed of the collision candidate vehicle, the collision angle when the collision candidate vehicle approaches the vehicle and collides therewith, longitudinal and lateral relative distances to the collision candidate vehicle which may be obtained by the signal monitored by the detection portion for the autonomous driving to thereby pre-estimate the movement position change of the vehicle due to the virtual collision with another vehicle selected as the collision candidate vehicle.

For example, because a state variable to estimate the movement position change of the vehicle due to the virtual collision with another vehicle selected as the collision candidate vehicle is determined by the rotational angular velocity Wz, the longitudinal acceleration Vx, and the lateral acceleration Vy, the state variable may be determined by a dynamic recursive equation using the traveling speed of the collision candidate vehicle, the collision angle when the collision candidate vehicle approaches the vehicle and collides therewith, longitudinal and lateral relative distances to the collision candidate vehicle, etc. monitored by the detection portion for the autonomous driving as variables.

Accordingly, the autonomous driving controller 100 may be configured to determine the movement distance of the vehicle moved by the translational motion and the rotation angle of the vehicle rotated by the rotation motion using the rotational angular velocity Wz as a variable, through the dynamic equation using the determined longitudinal acceleration Vx and the lateral acceleration Vy, which are state variables, as variables, estimating the determined movement distance of the vehicle by the translational motion and the rotation angle of the vehicle by the rotation motion as a position change of the vehicle due to the virtual collision with another vehicle.

Alternatively, the autonomous driving controller 100 may pre-estimate the movement position change of the vehicle due to the virtual collision with another vehicle selected as the collision candidate vehicle, based on various collision test result data on the vehicle, etc.

The autonomous driving controller 100 may pre-estimate the movement position change of the vehicle due to the virtual collision with another vehicle selected as the collision candidate vehicle, and then operate an alarm device (e.g., a horn) that makes a warning sound. In the present way, other vehicles and passengers may be warned in advance that a primary collision with another vehicle may occur and a secondary collision with a vehicle other than another vehicle or an obstacle may occur following the primary collision, preventing or minimizing primary and secondary collision accidents.

Meanwhile, the estimated movement position change of the vehicle due to the virtual collision with another vehicle may be different from the actual movement position change of the vehicle due to an actual collision with another vehicle, and thus may not be accurate.

For the present reason, when a side collision actually occurs by the collision candidate vehicle approaching while the vehicle is stopped, the autonomous driving controller 100 corrects the estimated position change of the vehicle due to the virtual collision with another vehicle to match the movement position change of the vehicle due to the actual collision with another vehicle, in step S105.

To the present end, when the actual collision with another vehicle occurs, the autonomous driving controller 100 receives a rotational angular velocity W'z detected by the yaw rate sensor 115 of the vehicle as a yaw rate signal, and longitudinal acceleration V'x and lateral acceleration V'y signals detected by the acceleration sensor 116 of the vehicle and corrects the estimated position change of the vehicle due to the virtual collision with another vehicle into the movement position change of the vehicle due to the actual collision with another vehicle.

For example, because the vehicle makes a translational motion and a rotation motion at a same time when a side collision actually occurs by the collision candidate vehicle approaching while the vehicle is stopped, the autonomous driving controller 100 may be configured to determine the movement distance of the vehicle moved by the translational motion based on the longitudinal acceleration V'x and lateral acceleration V'y signals detected by the acceleration sensor 116 and determine the rotation angle of the vehicle rotated by the rotation motion based on the rotational angular velocity W'z signal detected as a yaw rate signal by the yaw rate sensor 115, determining the determined movement distance of the vehicle moved by the translational motion and the determined rotation angle of the vehicle rotated by the rotation motion as a movement position change of the vehicle due to the actual collision with another vehicle.

In other words, the autonomous driving controller 100 may be configured to determine the movement distance of the vehicle moved by the translational motion and the rotation angle of the vehicle rotated by the rotation motion through the dynamic equation using the longitudinal acceleration V'x and the lateral acceleration V'y detected by the acceleration sensor 116 and the rotational angular velocity W'z detected by the yaw rate sensor 115 as variables, determining the determined movement distance of the vehicle moved by the translational motion and the rotation angle of the vehicle rotated by the rotation motion as a position change of the vehicle due to the actual collision with another vehicle.

Next, the autonomous driving controller 100 is configured to determine the possibility of the secondary collision in which the vehicle secondarily collides with a vehicle other than another vehicle or an obstacle in the vicinity based on the corrected movement position change of the vehicle due to the actual collision, in step S106.

For example, when there exists a vehicle other than another vehicle or an obstacle in the vicinity within the corrected movement position of the vehicle due to the actual collision, the autonomous driving controller 100 may be configured to determine that the secondary collision in which the vehicle collides with the vehicle other than another vehicle or the obstacle may occur, whereas when there does not exist a vehicle other than another vehicle or an obstacle in the vicinity within the corrected movement position of the vehicle, the autonomous driving controller 100 may be configured to determine that a secondary collision in which the vehicle collides with the vehicle other than another vehicle or the obstacle will not occur.

Here, whether there exists a vehicle other than another vehicle or an obstacle around the vehicle within the corrected movement position of the vehicle may be checked using the camera 11 of the detection portion for the autonomous driving, and the autonomous driving controller 100 may be configured to determine whether there exists a vehicle other than another vehicle or an obstacle around the vehicle within the corrected movement position of the vehicle by receiving a signal captured by the camera 11.

In step S106, when it is determined that the secondary collision in which the vehicle collides with the vehicle other than another vehicle or the obstacle will not occur, the secondary collision avoidance control using the driving torque and braking torque of the vehicle does not proceed.

For the present reason, as illustrated in FIG. 5, because there does not exist a vehicle other than another vehicle or an obstacle in the vicinity within the movement position of the vehicle 200, the secondary collision in which the vehicle collides with the vehicle other than another vehicle or the obstacle 220 does not occur even when the vehicle 200 makes a translational motion and a rotation motion after the vehicle 200 is hit from the side by another vehicle 210.

Conversely, when it is determined that the secondary collision in which the vehicle collides with the vehicle other than another vehicle or the obstacle may occur in step S106, the secondary collision avoidance control using the driving torque and braking torque of the vehicle proceeds in step S107.

The secondary collision avoidance control is configured to selectively apply a driving torque or braking torque to each wheel of the vehicle so that the vehicle turns toward an empty space in the vicinity to avoid a secondary collision with a vehicle other than another vehicle or an obstacle.

To the present end, the secondary collision avoidance control may include steps of applying a forward or backward driving torque to each wheel of the vehicle for a predetermined time period so that the vehicle moves forward or backward in a direction of avoiding the secondary collision, and selectively applying a driving torque or a braking torque to each wheel of the vehicle so that the vehicle turns in the direction of avoiding the secondary collision with a vehicle other than another vehicle or an obstacle.

Here, to turn the vehicle in the direction of avoiding the secondary collision, there are provided a control component, which may be the brake controller 130 and the motor controller 140, and an actuating component, which may be the brake system 132 and the in-wheel motor 142 mounted in each wheel.

Figure 6A:
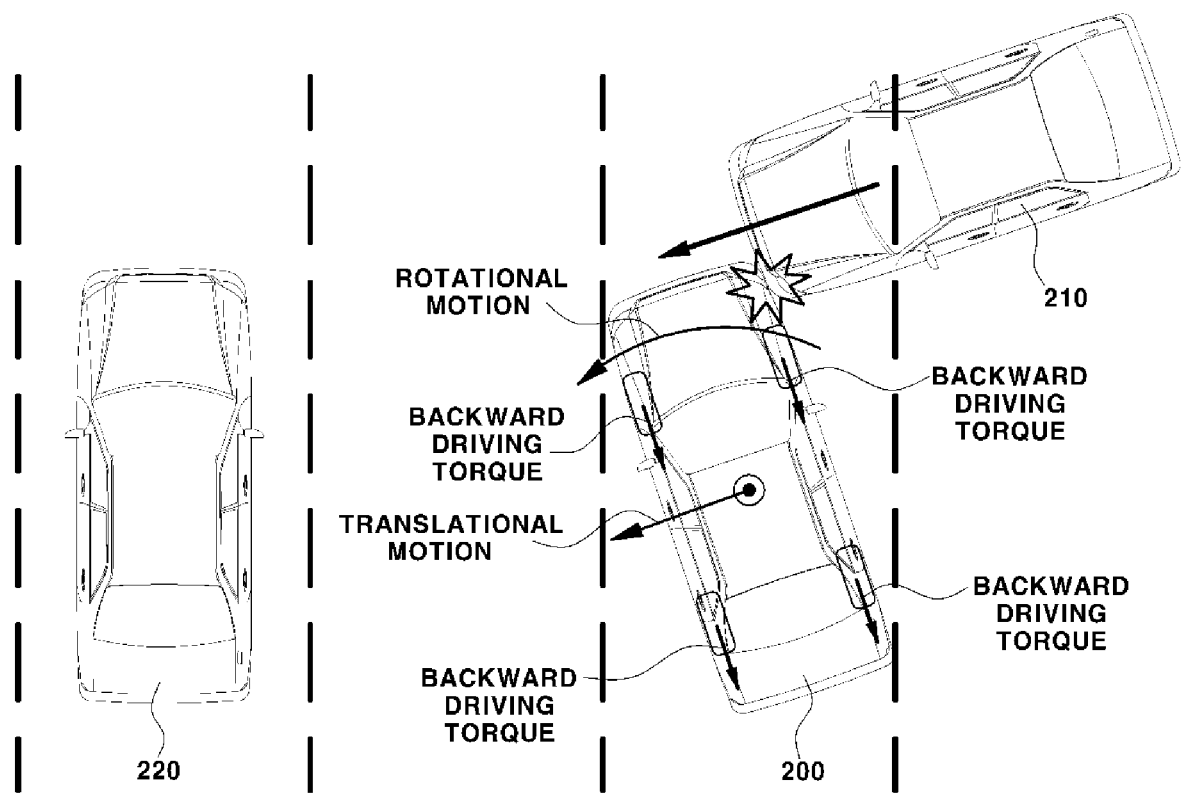
FIG. 6A and FIG. 6B are schematic views each illustrating an example in which a vehicle moves in a direction of avoiding a secondary collision by executing a method for controlling a secondary collision avoidance of a vehicle according to an exemplary embodiment of the present disclosure.

For example, as illustrated in FIG. 6A, when another vehicle 210 moves toward the vehicle 200 from the right to primarily collide with the front right side of the vehicle 200, whereby the vehicle 200 moves to the left by the translational motion and at the same time rotates counterclockwise by the rotation motion, and it is determined that the secondary collision in which the vehicle 200 collides with the vehicle other than another vehicle or the obstacle 220 may occur, a backward driving torque is first applied to each wheel for a predetermined time period to thereby move the vehicle 200 backwards in the direction of avoiding the secondary collision.

In other words, the vehicle 200 may first be reversed in the direction of avoiding the secondary collision with the vehicle other than another vehicle or the obstacle 220 by the backward driving torque of the in-wheel motor 142 by the control of the motor controller 140 according to the command of the autonomous driving controller 100.

Figure 6B:
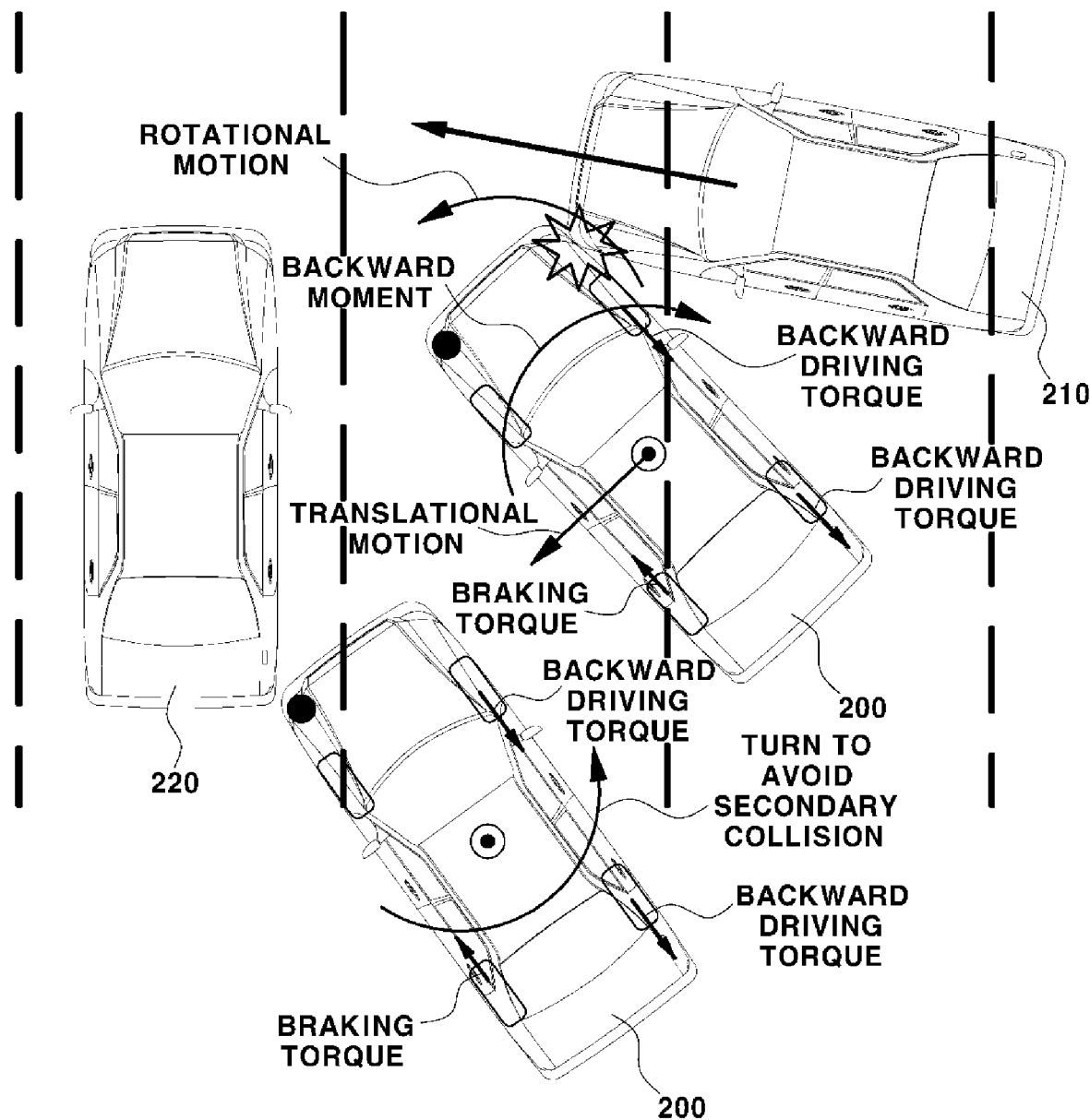

Thereafter, as illustrated in FIG. 6B, when the vehicle 200 continues to move to the left by the translational motion and at the same time continues to rotate counterclockwise by the rotation motion after the backward driving torque is applied to each wheel for a predetermined time period, a braking torque is applied to the rear left wheel of the vehicle and at the same time, a backward driving torque is applied to the right wheels so that a moment is generated in a direction opposite to the vehicle other than another vehicle or the obstacle 220.

Here, the brake system 132 mounted in the rear left wheel is operated by the control of the brake controller 130 according to the command of the autonomous driving controller 100 to thereby apply a braking torque to the rear left wheel, and at the same time the in-wheel motor 142 mounted in each of the right wheels is driven by the control of the motor controller 140 according to the command of the autonomous driving controller 100 to thereby apply a backward driving torque to the right wheels.

Accordingly, the vehicle 200 may be easily turned in the direction of avoiding the secondary collision with the vehicle other than another vehicle or the obstacle 220 and moved into an empty space.

After the backward driving torque is applied to each wheel for a predetermined time period, the autonomous driving controller 100 may send a steering command signal (e.g., rightward steering) for avoid a collision with the vehicle other than another vehicle or the obstacle to the steering controller 120 to allow the vehicle to be more easily turned to the direction of avoiding the secondary collision and to the empty space.

Accordingly, the secondary collision with the vehicle other than another vehicle or the obstacle which may occur after the vehicle is hit from the side by another vehicle may be avoided, minimizing injury to passengers.

Figure 7:
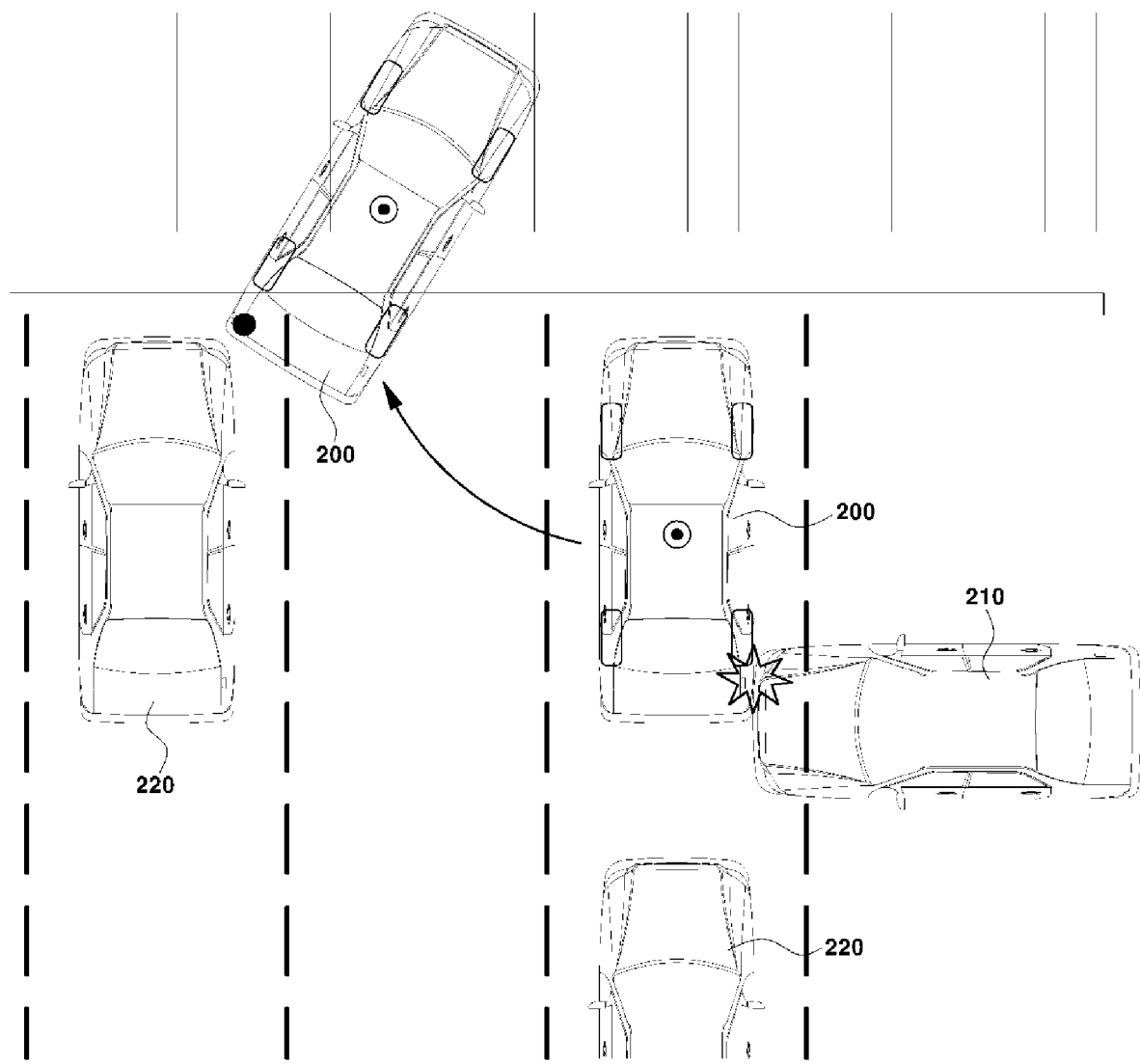
FIG. 7 is a schematic view exemplarily illustrating another example in which a vehicle moves in a direction of avoiding a secondary collision by executing a method for controlling a secondary collision avoidance of a vehicle according to an exemplary embodiment of the present disclosure.

Meanwhile, as illustrated in FIG. 7, when the vehicle 200 is stopped in front of a crosswalk by a traffic light signal, the steps S102 and S104 proceed even when the vehicle other than another vehicle or the obstacle 220 exists at the left and rear sides of the vehicle 200, and when another vehicle 210 approaches and crashes on the rear side portion of the vehicle 100, the steps S105 to S107 proceed to turn and move the vehicle 200 toward the crosswalk to avoid the secondary collision with the vehicle other than another vehicle or the obstacle 220.

Here, it is preferable to turn and move the vehicle toward the crosswalk to avoid the secondary collision with the vehicle other than another vehicle or the obstacle 220 only when the detection portion for the autonomous driving detects that there are no other vehicles and no pedestrians in the crosswalk.

As is apparent from the above description, various aspects of the present disclosure are directed to providing the following effect.

According to an exemplary embodiment of the present disclosure, after an autonomous vehicle is primarily hit from the side thereof by another vehicle while being stopped, a secondary collision with a vehicle other than another vehicle or an obstacle may be avoided by a secondary collision avoidance control, minimizing injury to passengers.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

A singular expression includes a plural expression unless the context clearly indicates otherwise.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method for controlling a secondary collision avoidance of a vehicle, the method comprising:
monitoring, by a detection portion for autonomous driving of the vehicle, other vehicles or obstacles around the vehicle while the vehicle is stopped;

selecting, by an autonomous driving controller, another vehicle among the other vehicles as a collision candidate vehicle likely to collide with the vehicle based on a monitoring signal of the detection portion for the autonomous driving;

pre-estimating, by the autonomous driving controller, a movement position change of the vehicle due to a virtual collision with another vehicle selected as the collision candidate vehicle;

when the collision candidate vehicle approaches and crashes on a side portion of the vehicle, correcting, by the autonomous driving controller, the pre-estimated movement position change of the vehicle due to the virtual collision with another vehicle;

determining, by the autonomous driving controller, a possibility of a secondary collision in which the vehicle secondarily collides with an additional vehicle other than another vehicle or an obstacle around the vehicle based on the corrected movement position change of the vehicle; and when the autonomous driving controller concludes that the vehicle is likely to collide with the additional vehicle other than another vehicle or the obstacle, proceeding, by the autonomous driving controller, a secondary collision avoidance control using a driving torque and a braking torque of the vehicle.

2. The method of claim 1, wherein the selecting of the collision candidate vehicle includes:

checking whether another vehicle approaching the vehicle exists within a predetermined radius of the vehicle, based on the monitoring signal of the detection portion for the autonomous driving;

when another vehicle approaching exists within the predetermined radius of the vehicle, determining a collision index indicating a possibility of collision with another vehicle approaching within the predetermined radius of the vehicle; and selecting other vehicle including a collision index exceeding a reference value as the collision candidate vehicle likely to collide with the vehicle.

3. The method of claim 2, wherein the autonomous driving controller is configured to control the collision index by multiplying a speed of another vehicle approaching the vehicle, a distance between the vehicle and another vehicle approaching the vehicle, and an expected collision area of the vehicle with respect to another vehicle approaching the vehicle.

4. The method of claim 3, wherein the expected collision area is determined differently based on a length, a width, and a height of the vehicle, a distance from a front end portion of the vehicle to a center of gravity of the vehicle, a distance from the center of gravity of the vehicle to another vehicle, and a relative heading angle of the vehicle with respect to another vehicle.

5. The method of claim 4, wherein the determining of the expected collision area includes:

setting a body of the vehicle in a virtual rectangular shape based on the length, the width, and the height of the vehicle, and the distance from the front end portion of the vehicle to the center of gravity of the vehicle;

identifying the distance from the center of gravity of the vehicle to another vehicle and the relative heading angle of the vehicle with respect to another vehicle;

projecting another vehicle in a direction of the relative heading angle when the distance from the center of gravity of the vehicle to another vehicle is within a predetermined distance; and overlapping another vehicle projected in the direction of the relative heading angle on the body of the vehicle set in the virtual rectangular shape to determine a cross-sectional area of an overlapping portion between the vehicle and another vehicle as the expected collision area.

6. The method of claim 1, wherein the pre-estimating of the movement position change of the vehicle due to the virtual collision with another vehicle selected as the collision candidate vehicle includes:

determining state variables including a longitudinal acceleration Vx, a lateral acceleration Vy, and a rotational angular velocity Wz by use of a traveling speed of the collision candidate vehicle, a collision angle when the collision candidate vehicle approaches the vehicle and collides therewith, and longitudinal and lateral relative distances to the collision candidate vehicle monitored by the detection portion for the autonomous driving as variables; and estimating a movement distance of the vehicle when the vehicle makes a translational motion, determined by use of the determined longitudinal acceleration Vx and lateral acceleration Vy as variables, and a rotation angle of the vehicle when the vehicle makes a rotation motion, determined by use of the rotational angular velocity Wz as a variable, as the movement position change of the vehicle due to the virtual collision with another vehicle.

7. The method of claim 6, further including, after pre-estimating the movement position change of the vehicle due to the virtual collision with another vehicle selected as the collision candidate vehicle, operating, by the autonomous driving controller, an alarm device to warn other vehicles and passengers of a primary collision or the secondary collision.

8. The method of claim 1, wherein the correcting of the pre-estimated movement position change of the vehicle due to the virtual collision with another vehicle includes:

receiving, by the autonomous driving controller, a yaw rate signal detected by a yaw rate sensor of the vehicle and longitudinal acceleration and lateral acceleration signals detected by an acceleration sensor of the vehicle when an actual collision with another vehicle occurs;

determining, by the autonomous driving controller, a movement distance of the vehicle moved by a translational motion based on longitudinal acceleration V' x and lateral acceleration V' y signals detected by the acceleration sensor and determining a rotation angle of the vehicle rotated by a rotation motion based on a rotational angular velocity W' z signal detected as a yaw rate signal by the yaw rate sensor; and determining the determined movement distance of the vehicle moved by the translational motion and the determined rotation angle of the vehicle rotated by the rotation motion as a movement position change of the vehicle due to the actual collision with another vehicle.

9. The method of claim 1, wherein the determining of the possibility of the secondary collision includes, when the additional vehicle other than another vehicle or an obstacle exists within the corrected movement position of the vehicle, concluding that the secondary collision in which the vehicle collides with the additional vehicle other than another vehicle or the obstacle occurs.

10. The method of claim 1, wherein the proceeding of the secondary collision avoidance control includes:

applying a forward or backward driving torque to each wheel of the vehicle for a predetermined time period so that the vehicle moves forward or backward in a direction of avoiding the secondary collision; and selectively applying a driving torque or a braking torque to each wheel of the vehicle so that the vehicle turns in a direction of avoiding the secondary collision with the additional vehicle other than another vehicle or the obstacle.

11. An apparatus for controlling a secondary collision avoidance of a vehicle, the apparatus comprising:

a detection portion for autonomous driving of the vehicle and configured for monitoring other vehicles or obstacles around the vehicle while the vehicle is stopped; and an autonomous driving controller including a processor and a non-transitory storage medium on which a program is recorded, the program executed by the processor and configured of performing:

selecting another vehicle among other vehicles as a collision candidate vehicle likely to collide with the vehicle based on a monitoring signal of the detection portion for the autonomous driving;

pre-estimating a movement position change of the vehicle due to a virtual collision with another vehicle selected as the collision candidate vehicle;

when the collision candidate vehicle approaches and crashes on a side portion of the vehicle, correcting the pre-estimated movement position change of the vehicle due to the virtual collision with another vehicle;

determining a possibility of a secondary collision in which the vehicle secondarily collides with an additional vehicle other than another vehicle or an obstacle around the vehicle based on the corrected movement position change of the vehicle; and when the processor concludes that the vehicle is likely to collide with the additional vehicle other than another vehicle or the obstacle, proceeding a secondary collision avoidance control using a driving torque and a braking torque of the vehicle.

12. The apparatus of claim 11, wherein the selecting of the collision candidate vehicle includes:

checking whether another vehicle approaching the vehicle exists within a predetermined radius of the vehicle, based on the monitoring signal of the detection portion for the autonomous driving;

when another vehicle approaching exists within the predetermined radius of the vehicle, determining a collision index indicating a possibility of collision with another vehicle approaching within the predetermined radius of the vehicle; and selecting other vehicle including a collision index exceeding a reference value as the collision candidate vehicle likely to collide with the vehicle.

13. The apparatus of claim 12, wherein the processor is configured to control the collision index by multiplying a speed of another vehicle approaching the vehicle, a distance between the vehicle and another vehicle approaching the vehicle, and an expected collision area of the vehicle with respect to another vehicle approaching the vehicle.

14. The apparatus of claim 13, wherein the expected collision area is determined differently based on a length, a width, and a height of the vehicle, a distance from a front end portion of the vehicle to a center of gravity of the vehicle, a distance from the center of gravity of the vehicle to another vehicle, and a relative heading angle of the vehicle with respect to another vehicle.

15. The apparatus of claim 14, wherein the determining of the expected collision area includes:

setting a body of the vehicle in a virtual rectangular shape based on the length, the width, and the height of the vehicle, and the distance from the front end portion of the vehicle to the center of gravity of the vehicle;

identifying the distance from the center of gravity of the vehicle to another vehicle and the relative heading angle of the vehicle with respect to another vehicle;

projecting another vehicle in a direction of the relative heading angle when the distance from the center of gravity of the vehicle to another vehicle is within a predetermined distance; and overlapping another vehicle projected in the direction of the relative heading angle on the body of the vehicle set in the virtual rectangular shape to determine a cross-sectional area of an overlapping portion between the vehicle and another vehicle as the expected collision area.

16. The apparatus of claim 11, wherein the pre-estimating of the movement position change of the vehicle due to the virtual collision with another vehicle selected as the collision candidate vehicle includes:

determining state variables including a longitudinal acceleration $V_x$, a lateral acceleration $V_y$, and a rotational angular velocity $W_z$ by use of a traveling speed of the collision candidate vehicle, a collision angle when the collision candidate vehicle approaches the vehicle and collides therewith, and longitudinal and lateral relative distances to the collision candidate vehicle monitored by the detection portion for the autonomous driving as variables; and estimating a movement distance of the vehicle when the vehicle makes a translational motion, determined by use of the determined longitudinal acceleration $V_x$ and lateral acceleration $V_y$ as variables, and a rotation angle of the vehicle when the vehicle makes a rotation motion, determined by use of the rotational angular velocity $W_z$ as a variable, as the movement position change of the vehicle due to the virtual collision with another vehicle.

17. The apparatus of claim 16, further including:

after pre-estimating the movement position change of the vehicle due to the virtual collision with another vehicle selected as the collision candidate vehicle, operating, by the processor, an alarm device to warn other vehicles and passengers of a primary collision or the secondary collision.

18. The apparatus of claim 11, wherein the correcting of the pre-estimated movement position change of the vehicle due to the virtual collision with another vehicle includes:

receiving, by the processor, a yaw rate signal detected by a yaw rate sensor of the vehicle and longitudinal acceleration and lateral acceleration signals detected by an acceleration sensor of the vehicle when an actual collision with another vehicle occurs;

determining, by the processor, a movement distance of the vehicle moved by a translational motion based on longitudinal acceleration $V'_x$ and lateral acceleration $V'_y$ signals detected by the acceleration sensor and determining a rotation angle of the vehicle rotated by a rotation motion based on a rotational angular velocity $W'_z$ signal detected as a yaw rate signal by the yaw rate sensor; and determining the determined movement distance of the vehicle moved by the translational motion and the determined rotation angle of the vehicle rotated by the rotation motion as a movement position change of the vehicle due to the actual collision with another vehicle.

19. The apparatus of claim 11, wherein the determining of the possibility of the secondary collision includes:
when there exists an additional vehicle other than another vehicle or an obstacle within the corrected movement position of the vehicle, concluding that the secondary collision in which the vehicle collides with the additional vehicle other than another vehicle or the obstacle occurs.

20. The apparatus of claim 11, wherein the proceeding of the secondary collision avoidance control includes:
applying a forward or backward driving torque to each wheel of the vehicle for a predetermined time period so that the vehicle moves forward or backward in a direction of avoiding the secondary collision; and
selectively applying a driving torque or a braking torque to each wheel of the vehicle so that the vehicle turns in a direction of avoiding the secondary collision with the additional vehicle other than another vehicle or the obstacle.

* * * * *